United States Patent [19]

Mishima et al.

[11] Patent Number: 5,208,288

[45] Date of Patent: May 4, 1993

[54] MODIFIED NONFLAMMABLE RESIN COMPOSITION

[75] Inventors: Ikuhiro Mishima; Kenji Nishimoto; Hideki Hosoi, all of Hyogo, Japan

[73] Assignee: Kanegafuchi Kagaku Kogyo Kabushiki Kaisha, Osaka, Japan

[21] Appl. No.: 684,117

[22] Filed: Apr. 12, 1991

[30] Foreign Application Priority Data

Apr. 20, 1990 [JP] Japan ................... 2-106249

[51] Int. Cl.$^5$ ...................... C08L 25/04; C08L 27/06; C08L 51/04; C08L 55/02
[52] U.S. Cl. .......................... 525/84; 525/83; 525/85; 525/86; 525/227; 525/228; 525/233; 525/238
[58] Field of Search .................. 525/227, 235, 84, 86, 525/83, 85

[56] References Cited

U.S. PATENT DOCUMENTS

| | | | |
|---|---|---|---|
| 3,053,800 | 9/1962 | Grabowski et al. | 525/86 |
| 3,626,033 | 12/1971 | Keskkula et al. | 260/876 |
| 3,678,132 | 7/1972 | Isogawa et al. | 525/84 |
| 3,780,134 | 12/1973 | Lonning | 525/71 |

FOREIGN PATENT DOCUMENTS

| | | |
|---|---|---|
| 0386789 | 9/1990 | European Pat. Off. . |
| 2010633 | 9/1970 | Fed. Rep. of Germany . |
| 1226270 | 7/1960 | France . |
| 2099161 | 3/1972 | France . |

*Primary Examiner*—Carman J. Seccuro, Jr.
*Attorney, Agent, or Firm*—Armstrong, Westerman, Hattori, McLeland & Naughton

[57] ABSTRACT

A modified nonflammable molding resin composition. The composition is a blend of (A) a nonflammable resin composition composed of 30 to 80% by weight of a styrene resin having a methyl ethyl keton-soluble portion having a reduced viscosity of 0.2 to 0.5 dl/g and 70 to 20% by weight of a vinyl chloride resin having a polymerization degree of 400 to 800; and 0.5 to 15 parts, based on 100 parts by weight of the nonflammable resin composition (A), of (B) a copolymer of a vinyl cyanide, an alkyl methacrylate, an aromatic vinyl compound and another copolymerizable vinyl monomer in specified ratios and having a reduced viscosity of not less than 1.8 dl/g. The composition has improved heat stability in injection molding and excellent heat resistance.

3 Claims, No Drawings

MODIFIED NONFLAMMABLE RESIN COMPOSITION

FIELD OF THE INVENTION

The present invention relates to a modified nonflammable resin composition. More particularly, the present invention relates to a modified nonflammable resin composition which comprises a nonflammable resin composition of a low-molecular-weight styrene type resin and a low-polymerization-degree vinyl chloride type resin, and blended therewith as a minor essential component, a copolymer prepared by copolymerizing a vinyl cyanide, an alkyl methacrylate, an aromatic vinyl compound, and another copolymerizable vinyl monomer at a specified weight ratio. The resin composition has excellent heat stability in injection molding, and excellent heat resistance.

BACKGROUND OF THE INVENTION

In the specification of the present invention, the term "heat stability" means resistance to thermal decomposition such as discoloration and deterioration, and the term "heat resistance" means resistance of a molded resin to thermal deformation.

Nonflammable resin compositions composed of a low-molecular-weight styrene resin and a low-polymerization-degree vinyl chloride resin are being used in increasing amounts as materials for housings of office automation (OA) apparatuses owing to their superior mechanical properties and low cost.

These nonflammable resin compositions, however, are difficult to mold because of their low heat stability and are liable to cause burning or mold flashing of molded products. This problem is considered to result from the vinyl chloride resin contained in the nonflammable resin composition increasing in stickiness during injection molding, leading to sticking to metallic parts such as a screw, cylinder, mold, or the like to cause partial stagnation of the resin and heat generation by shearing, thereby resulting in thermal decomposition of the resin.

For offsetting the above disadvantage, a large amount of a stabilizer or a lubricant is generally added to the nonflammable resin composition to improve the heat stability.

This method, however, is unsatisfactory because of the high cost of the starting materials and poor quality of the product such as low heat distortion temperature, namely, low heat resistance.

In view of such circumstances, the inventors of the present invention made a comprehensive investigation and considered the fact that the nonflammable resin composition is not a high-molecular styrene resin generally used as an injection-molding resin, but is a specific injection molding resin composition composed of a low-molecular styrene resin blended with a low-polymerization-degree vinyl chloride resin. As the result of their investigation, the inventors have found that the heat stability of the nonflammable resin composition can be improved by the addition of a specific copolymer as a modifier without impairing heat resistance and without adding a stabilizer or a lubricant as disclosed in JP-A-2-305840, JP-A-2-11644, JP-A-1-236252, JP-A-1-221447, JP-A-63-69854, and JP-A-63-63736 ("JP-A means unexamined Japanese patent publication).

SUMMARY OF THE INVENTION

An object of the present invention is to provide a modified nonflammable resin composition which has improved heat stability and well-balanced properties of heat resistance, heat stability, impact strength, and nonflammability.

The present invention provides a modified nonflammable resin composition, comprising 100 parts by weight of a nonflammable resin composition (A) composed of 30 to 80 % by weight of a styrene resin having a methyl ethyl keton-soluble portion having a reduced viscosity in the range of from 0.2 to 0.5 dl/g (in N,N-dimethylformamide at 30° C. at a concentration of 0.3 g/dl), and 70 to 20% by weight of a vinyl chloride resin having a polymerization degree of 400 to 800; and 0.5 to 15 parts by weight of a copolymer (B) prepared by copolymerizing a vinyl cyanide, an alkyl methacrylate, an aromatic vinyl compound, and another copolymerizable vinyl monomer in a ratio specified by the equations below, and having a reduced viscosity of not less than 1.8 dl/g (in N,N-dimethylformamide at 30° C. at a concentration of 0.3 g/dl):

$$15 \leq a + b/4 \leq 40$$

$$d = 100 - a - b - c$$
$$a \geq 0, b \geq 0$$

$$0 \leq c \geq 85, 0$$

$$0 \leq d \leq 20$$

with proviso that when a takes zero, b does not take zero, and when b takes zero, both a and c do not take zero, where a, b, c, and d respectively denote percentage by weight of the vinyl cyanide compound (a), the alkyl methacrylate (b), the aromatic vinyl compound (c), and the vinyl monomer (d) in the copolymer (B).

DETAILED DESCRIPTION OF THE INVENTION

The nonflammable resin composition (A) in the present invention is a blend of a styrene resin and a vinyl chloride resin in a specified ratio.

The styrene resin useful in the invention includes those resins highly compatible with a vinyl chloride resin, such as ABS (acrylonitrile-butadiene-styrene) resins, AS (acrylonitrile-styrene) resins, MBS (methyl-methacrylate-butadiene-styrene) resins, MABS (methylmethacrylate-acrylonitrile-butadiene-styrene) resins, acrylonitrilebutadiene-styrene-α-methylstyrene four-component copolymers, acrylonitrile-methyl methacrylate-butadiene-styrene-α-methylstyrene five-component copolymers, acrylonitrile-butadiene-styrene-α-methylstyrene-maleimide five-component copolymers, AAS (acrylonitrile-alkylacrylate-styrene) resins, AES (acrylonitrile-ethylenepropylene-styrene) resins, styrene-maleic anhydride copolymers, styrene-maleimide copolymers, and the like.

The styrene resins used in the resin (A) in the present invention comprises a rubber portion, a crosslinked portion (a methyl ethyl ketone-insoluble portion), and a nonrubber portion (methyl ethyl ketone-soluble portion), the non-rubber portion having a reduced viscosity in the range of 0.2 to 0.5 dl/g in N,N-dimethylformamide at a concentration of 0.3 g/dl at a temperature of 30° C. (Hereinafter reduced viscosity is that measured under the same conditions.)

At a reduced viscosity below 0.2 dl/g, the impact strength is lower, while at a reduced viscosity above 0.5 dl/g, the heat stability is lower.

The vinyl chloride resins useful in the present invention include homopolymers and copolymers having a polymerization degree in the range of from 400 to 600, preferably from 450 to 750, and containing vinyl chloride units in an amount of not less than 80% by weight, and postchlorinated polyvinyl chloride resins prepared therefrom. The comonomer in the copolymer can be a monovinylidene compound such as ethylene, vinyl acetate, methyl methacrylate, butyl acrylate, or the like, which can be contained in an amount of up to 20% by weight of the copolymer.

In the present invention, the vinyl chloride resin has a polymerization degree of from 400 to 800. At a polymerization degree below 400, the impact strength is lower, and above 800, the heat stability is remarkably lower.

The nonflammable resin composition (A) in the present invention is prepared by blending 30 to 80 % by weight of the styrene resin with 70 to 20% by weight of the vinyl chloride resin, and preferably 35 to 75% by weight of the styrene resin with 65 to 25% by weight of the vinyl chloride resin based on a total amount thereof.

At an amount of the styrene resin below 30% by weight, the heat stability and the heat resistance lowered due to the relatively high content of the vinyl chloride resin, while at an amount of the styrene resin above 80% by weight, nonflammability and the impact strength becomes remarkably lower.

The modified nonflammable resin composition of the present invention is prepared by blending a specified copolymer (B) as a modifier with the nonflammable resin composition (A) to improve the heat stability without impairing the heat resistance of the nonflammable resin composition (A).

The copolymer (B) comprises a vinyl cyanide compound (a), an alkyl methacrylate (b), an aromatic vinyl compound (c), and another copolymerizable vinyl monomer (d) in the weight ratios as defined in the equations below, and has a reduced viscosity of not less than 1.8 dl/g:

$$15 \leq a + b/4 \leq 40$$

$$d = 100 - a - b - c$$

$$a \geq 0, b \geq 0$$

$$0 \leq c \leq 85, \text{ and}$$

$$0 \leq d \leq 20$$

with proviso that when a takes zero, b does not take zero, and when b takes zero, both a and c do not take zero. where a, b, c, and d respectively denote percentage by weight of the vinyl cyanide compound (a), the alkyl methacrylate (b), the aromatic vinyl compound (c), and the vinyl monomer (d).

The vinyl cyanide compound (a) can be acrylonitrile, methacrylonitrile, or the like.

The alkyl methacrylate (b) can be methyl methacrylate, ethyl methacrylate, butyl methacrylate, 2-ethylhexyl methacrylate, or the like.

The aromatic vinyl compound (c) can be styrene, p-methylstyrene, α-methylstyrene, chlorostyrene, or the like.

The copolymerizable vinyl monomer (d) can be an alkyl acrylate such as methyl acrylate, ethyl acrylate, butyl acrylate, 2-ethylhexyl acrylate or the like.

The copolymer (B) used in the present invention has a reduced viscosity of not less than 1.8 dl/g, and preferably not less than 2.0 dl/g. At a reduced viscosity below 1.8 dl/g, the improvement in heat stability intended by the present invention is not satisfactorily achieved.

The copolymer (B) is blended in the present invention in an amount of from 0.5 to 15 parts by weight, and preferably from 1 to 10 parts by weight, with respect to 100 parts by weight of the nonflammable resin composition (A). With an amount below 0.5 parts by weight, a satisfactory improvement in heat stability is not achieved, while with an amount above 15 parts by weight the heat stability is lowered.

The copolymer (B) in the present invention is readily synthesized by a usual emulsion polymerization method by a use of a thermal decomposition type initiator or a redox type initiator such as potassium persulfate (KPS).

For desired adjustment of the powder properties of the copolymer (B) after drying, the copolymer (B) can be synthesized by polymerizing the starting monomers of the copolymer (B) together with another monomer having an ethylenically unsaturated bond such as methyl methacrylate, vinyl chloride, styrene, α-methylstyrene, acrylonitrile, or the like or a mixture of two or more of these, which is capable of giving a polymer highly compatible with the vinyl chloride type polymer. Otherwise the copolymer (B) can be synthesized in the presence of a styrene resin or a vinyl chloride resin.

Also, a latex of a polymer which is compatible with both the copolymer (B) and the vinyl chloride resin can be blended in a latex state.

Further, the copolymer (B) may be used optionally by blending with the strylene resin in the same amount as used in the nonflammable resin composition (A) or partial thereof, in a latex state.

As described above, the modified nonflammable resin composition of the present invention is prepared by blending a nonflammable resin composition (A), which has been prepared by blending a specific styrene resin and a low-polymerization-degree vinyl chloride resin in a specified weight ratio, with a specified copolymer (B) as an essential component. If necessary, a known antioxidant, heat stabilizer, or lubricant can be added. Further, a UV absorbing agent, pigment, antistatic agent, flame-retardant, flame-retarding auxiliary, or the like can also be added thereto. In particular, when the modified nonflammable resin composition is used as an injection-molding resin composition, it is preferred to add an additive widely used for styrene resins such as a phenol-type antioxidant and a phosphite type stabilizer; a stabilizer used for vinyl chloride resins such as a tin-type stabilizer or a lead-type stabilizer; and an internal or external lubricant such as a fatty acid ester, metal soap, wax, or the like, for the purpose of providing high performance injection-molded articles.

The modified nonflammable resin composition of the present invention exhibits satisfactory nonflammability by the action of the vinyl chloride resin. If it is used for application requiring higher nonflammability, a small amount of a halogen-type fire retardant or a fire-retarding auxiliary such as an antimony compound can be blended therewith.

The present invention is described below in more detail in the following Examples. The invention, however, is not limited by the Examples in any way, and may be suitably modified within the gist of the invention. The term "part" in the Examples, Comparative Examples, and Tables is based on weight.

EXAMPLES (I) Preparation of Modified Nonflammable Resin Composition

EXAMPLE 1

(1) Synthesis of Copolymer (B)

200 Parts of water, and 1 part of sodium dioctylsulfosuccinate were added to a reaction vessel equipped with a stirrer and a cooler. The temperature was raised to 60° C., and the interior of the vessel was deaerated and purged with nitrogen. Then 0.05 part of potassium persulfate was added thereto. Having confirmed the internal temperature to be at 60° C., 90 parts of methyl methacrylate and 10 parts of butyl acrylate were continuously added dropwise for 5 hours. Thereafter the content of the vessel was stirred at 60° C. for 1 hour to prepare a latex of the copolymer (B). The copolymer (B) was separated by salting-out the latex, and was granulated.

The reduced viscosity of the copolymer (B) was measured in the manner shown below.

The copolymer (B) was dissolved in N,N-dimethylformamide to form a polymer solution at a concentration (C) of 0.3 g/dl. The efflux time (t) (seconds) of the polymer solution was measured at 30° C. according to JIS-K6721 by use of an Ubbelohde type viscometer (an automatic capillary viscometer apparatus, made by Shibayama Kagaku Kikai Seisakusho K.K.). Separately, the efflux time $t_0$ (seconds) of the solvent, namely N,N-dimethylformamide, was measured at the same temperature with the same apparatus. The reduced viscosity ($\eta_{red}$) was calculated using the equation below:

$$\eta_{red} = (t/t_0 - 1)/C$$

(2) Preparation of Modified Nonflammable Injection-Molding Resin Composition Containing Modifier (B)

5 Parts of the modifier (B) synthesized as described in the above Item (1), 50 parts of Styrene resin II and 50 parts of Vinyl chloride resin II shown in Table 1 as the resin components, 3 parts of a tin type stabilizer, and 2 parts of a lubricant were blended by a Super-mixer SMG-10 manufactured by Kawada Machinery Co., Ltd. The blended matter was pelletized by a 40-mm extruder FS-150 manufactured by Tabata Industrial Machinery Co., Ltd., to prepare pellets of a modified nonflammable resin composition for injection molding which contains the nonflammable resin composition (A) and the modifier (B). The tin type stabilizer used was a mixture of 2 parts of dibutyltin maleate with 1 part of dibutyltin mercaptide. The lubricant used was a mixture of 1 part of glycerin tristearate with 1 part of polyethylene wax.

EXAMPLES 2-14 and COMPARATIVE EXAMPLE 1-15

The modifiers (B) shown in Table 2 and pellets of a modified nonflammable resin compositions were prepared in the same manner as in Example 1.

The meaning of the abbreviations in Table 1 and Table 2 are as below:
AN: Acrylonitrile
St: Styrene
α-St: α-Methylstyrene
PMI: Phenylmaleimide
PBd: Polybutadiene rubber on having average particle diameter of 2500
PBA: Poly(butyl acrylate) rubber having average particle diameter of 2300
MMA: Methyl methacrylate
BA: Butyl acrylate.

The reduced viscosities $\eta_{red}$ of the styrene resins I to VI in Table 1 and the copolymers (B) in Table 2 were measured with the insoluble portion being separated in such a manner that 1 g of the styrene resin or the copolymer (B) is dissolved in 40 ml of methyl ethyl ketone, and subsequently the solution is subjected three times to centrifugal separation of 30000 rpm for 1 hour.

TABLE 1

| | Styrene resin | | | | | | | Vinyl chloride resin | | |
|---|---|---|---|---|---|---|---|---|---|---|
| | AN | St | α-St | PMI | PBd | PBA | $\eta_{red}$ | Average polymerization degree | Chlorine content (%) | Composition |
| | (Parts) | | | | | | | | | |
| I | 22 | 58 | — | — | 20 | — | 0.16 | I. 320 | 57 | PVC |
| II | 22 | 58 | — | — | 20 | — | 0.36 | II. 610 | 57 | " |
| III | 22 | 58 | — | — | 20 | — | 0.62 | III. 930 | 57 | " |
| IV | 20 | 5 | 55 | — | 20 | — | 0.34 | IV. 610 | 60 | Chlorinated PVC |
| V | 10 | 5 | 35 | 25 | 20 | — | 0.35 | V. 610 | 63 | " |
| VI | 22 | 58 | — | — | — | 20 | 0.36 | | | |

TABLE 2

| | Copolymer (B) (Parts) | | | | | | | | | | | |
|---|---|---|---|---|---|---|---|---|---|---|---|---|
| | B1 | B2 | B3 | B4 | B5 | B6 | B7 | B8 | B9 | B10 | B11 | B12 |
| MMA | 90 | 75 | 85 | — | — | 80 | 20 | 60 | 40 | 90 | — | 25 |
| AN | — | — | — | 25 | 25 | 5 | 20 | 10 | — | — | 50 | 5 |
| St | — | — | 10 | 75 | 55 | — | 60 | 10 | 50 | — | 40 | 70 |
| BA | 10 | 25 | 5 | — | 20 | 15 | — | 20 | 10 | 10 | 10 | — |
| $\eta_{red}$ | 3.1 | 3.0 | 2.9 | 7.0 | 5.0 | 2.8 | 4.5 | 4.0 | 3.0 | 1.2 | 3.2 | 3.4 |

TABLE 3

| | Modified nonflammable resin composition | | | | | | | | | | | | |
|---|---|---|---|---|---|---|---|---|---|---|---|---|---|
| | Components of nonflammable resin composition (Prts) | | | | | | | | | | | Copolymer (B) | |
| | Styrene resin | | | | | | Vinyl chloride resin | | | | | Blended | |
| | I | II | III | IV | V | VI | I | II | III | IV | V | amount | Kind |
| Example | | | | | | | | | | | | | |
| 1 | — | 50 | — | — | — | — | — | 50 | — | — | — | 5 | B1 |
| 2 | — | 50 | — | — | — | — | — | 50 | — | — | — | 10 | B1 |
| 3 | — | 50 | — | — | — | — | — | 50 | — | — | — | 5 | B2 |
| 4 | — | 50 | — | — | — | — | — | 50 | — | — | — | 5 | B3 |
| 5 | — | 50 | — | — | — | — | — | 50 | — | — | — | 5 | B4 |
| 6 | — | 50 | — | — | — | — | — | 50 | — | — | — | 5 | B5 |
| 7 | — | 50 | — | — | — | — | — | 50 | — | — | — | 5 | B6 |
| 8 | — | 50 | — | — | — | — | — | 50 | — | — | — | 5 | B7 |
| 9 | — | 50 | — | — | — | — | — | 50 | — | — | — | 5 | B8 |
| 10 | — | — | — | 50 | — | — | — | 50 | — | — | — | 5 | B1 |
| 11 | — | — | — | — | 50 | — | — | 50 | — | — | — | 5 | B1 |
| 12 | — | — | — | — | — | 50 | — | 50 | — | — | — | 5 | B1 |
| 13 | — | 50 | — | — | — | — | — | — | — | 50 | — | 5 | B1 |
| 14 | — | 50 | — | — | — | — | — | — | — | — | 50 | 5 | B1 |
| Comparative Example | | | | | | | | | | | | | |
| 1 | — | 50 | — | — | — | — | — | 50 | — | — | — | 0 | — |
| 2 | — | 50 | — | — | — | — | — | 50 | — | — | — | 20 | B1 |
| 3 | — | 50 | — | — | — | — | — | 50 | — | — | — | 5 | B9 |
| 4 | — | 50 | — | — | — | — | — | 50 | — | — | — | 5 | B10 |
| 5 | — | 50 | — | — | — | — | — | 50 | — | — | — | 5 | B11 |
| 6 | — | 50 | — | — | — | — | — | 50 | — | — | — | 5 | B12 |
| 7 | — | 25 | — | — | — | — | — | 75 | — | — | — | 5 | B1 |
| *8 | — | 85 | — | — | — | — | — | 15 | — | — | — | 5 | B1 |
| 9 | — | — | 50 | — | — | — | — | 50 | — | — | — | 5 | B1 |
| 10 | 50 | — | — | — | — | — | 50 | — | — | — | — | 5 | B1 |
| 11 | — | — | — | 50 | — | — | — | 50 | — | — | — | 0 | — |
| 12 | — | — | — | — | 50 | — | — | 50 | — | — | — | 0 | — |
| 13 | — | — | — | — | — | 50 | — | 50 | — | — | — | 0 | — |
| 14 | — | 50 | — | — | — | — | — | — | — | 50 | — | 0 | — |
| 15 | — | 50 | — | — | — | — | — | — | — | — | 50 | 0 | — |

*In Comparative example 8, 3 parts of antimony trioxide was blended as an flame retarding auxiliary.

TABLE 4

| | Heat stability (minutes) | Heat resistance (°C.) | Impact strength (kg-cm/cm) | Non-flammability (grade) |
|---|---|---|---|---|
| Example | | | | |
| 1 | 26.0 | 72.1 | 14.3 | V-0 |
| 2 | 27.0 | 71.8 | 12.8 | V-0 |
| 3 | 24.3 | 71.5 | 14.0 | V-0 |
| 4 | 25.1 | 71.7 | 14.2 | V-0 |
| 5 | 21.2 | 72.1 | 15.4 | V-0 |
| 6 | 23.4 | 71.8 | 16.5 | V-0 |
| 7 | 24.8 | 71.6 | 16.2 | V-0 |
| 8 | 22.4 | 72.3 | 15.2 | V-0 |
| 9 | 23.1 | 71.7 | 14.6 | V-0 |
| 10 | 22.2 | 76.2 | 20.4 | V-0 |
| 11 | 19.8 | 81.0 | 13.7 | V-0 |
| 12 | 29.6 | 71.0 | 11.0 | V-0 |
| 13 | 21.1 | 76.3 | 14.8 | V-0 |
| 14 | 17.7 | 81.1 | 16.2 | V-0 |
| Comparative Example | | | | |
| 1 | 18.1 | 71.8 | 18.1 | V-0 |
| 2 | 17.5 | 72.4 | 6.8 | V-0 |
| 3 | 18.6 | 71.6 | 10.2 | V-0 |
| 4 | 18.8 | 71.9 | 16.4 | V-0 |
| 5 | 17.4 | 72.3 | 7.1 | V-0 |
| 6 | 18.3 | 71.7 | 10.4 | V-0 |
| 7 | 18.8 | 67.5 | 24.8 | V-0 |
| 8 | 16.7 | 76.8 | 7.7 | V-1 |
| 9 | 10.3 | 72.6 | 25.9 | V-0 |
| 10 | 28.7 | 70.8 | 4.6 | V-0 |
| 11 | 14.2 | 76.6 | 24.4 | V-0 |
| 12 | 11.1 | 81.5 | 17.6 | V-0 |
| 13 | 21.4 | 70.6 | 13.5 | V-0 |
| 14 | 14.6 | 76.9 | 18.8 | V-0 |
| 15 | 11.4 | 81.8 | 20.2 | V-0 |

(II) Evaluation Test

The pellets of the respective modified nonflammable resin compositions prepared in Examples 1 to 14 and Comparative Examples 1 to 15 were molded into test specimens by a 5-ounce injection molding machine at a screw rotation rate of 80 rpm at a nozzle temperature set at 190° C. The test specimens were tested for heat stability, heat resistance, impact strength, and nonflammability according to the test methods below.

Heat stability

The time (minutes) elapsed before decomposition begins was measured by means of a Brabender Plastograph at 200° C. at rotation rate of 100 rpm.

Heat resistance

HDT (Heat distortion temperature) was measured according to ASTM-D658.

Impact strength

Izod impact strength was measured according to ASTM-D256.

Nonflammability

Nonflammability was measured according to UL-94V.

The test results are shown in Table 4.

In Table 4, the nonflammable resin composition, for example, comprising Styrene resin II and Vinyl chloride resin II (Example 1) exhibits a high heat stability of as much as 26.0 (minutes) in the case where Copolymer B1 is blended therewith, while the same nonflammable resin composition without the blended copolymer (Comparative Example 1) has a low heat stability of 18.1 (minutes).

Similar observations can be made in comparisons of Example 10 with Comparative Example 11, Example 12 with Comparative Example 13, Example 13 with Comparative Example 14, and Example 14 with Comparative Example 15 where the constitution and the molecular weight is the same in respective combinations.

Accordingly, the modified nonflammable resin compositions of the present invention (Examples 1 to 14) are understood to have improved heat stability as compared to those of the Comparative Examples.

As described above, the modified nonflammable resin composition of the present invention exhibits excellent properties such as improved heat stability.

While the invention has been described in detail and with reference to specific embodiments thereof, it will be apparent to one skilled in the art that various changes and modifications can be made therein without departing from the spirit and scope thereof.

What is claimed is:

1. A modified nonflammable resin composition comprising 100 parts by weight of a nonflammable resin composition (A) composed of 30 to 80% by weight of a styrene resin comprising a rubber portion, a cross-linked portion and a non-rubber portion, said styrene resin having a methyl ethyl (keton-soluble) ketone-soluble portion having a reduced viscosity in the range of from 0.2 to 0.5 dl/g in N,N-dimethylformamide at 30° C. at a concentration of 0.3 g/dl, and 70 to 20% by weight of a vinyl chloride resin having a polymerization degree of 400 to 800; and 0.5 to 15 parts by weight of a copolymer (B) prepared by copolymerizing (a) a vinyl cyanide, (b) an alkyl methacrylate, (c) an aromatic vinyl compound, and (d) another copolymerizable vinyl monomer in amounts specified by the equation below, and having a reduced viscosity of not less than 1.8 dl/g in N,N-dimethylformamide at 30° C. at a concentration of 0.3 g/dl;

$$15 \leq a + b/4 \leq 40$$

$$d = 100 - a - b - c$$

$$a \geq 0, b \geq 0$$

$$0 \leq c \leq 85, \text{ and}$$

$$0 \leq d \leq 20$$

with proviso that when a is zero, b is not zero and when b is zero, both a and c are not zero; wherein a, b, c, and d, respectively, denote percentage by weight of the vinyl cyanide compound (a), the alkyl methacrylate (b), the aromatic vinyl compound (c), and the copolymerizable vinyl monomer (d).

2. A modified nonflammable resin composition as in claim 1, wherein the nonflammable resin composition (A) is composed of the styrene resin having a reduced viscosity of 0.22 to 0.45 dl/g and the vinyl chloride resin having a polymerization degree of 450 to 700, and the copolymer (B) has a reduced viscosity of not less than 2.0 dl/g.

3. A modified nonflammable resin composition as in claim 2, wherein the copolymer (B) prepared by copolymerizing a vinyl cyanide (a), an alkyl methacrylate (b) and an aromatic vinyl compound (C) as being indispensable.

* * * * *